(12) United States Patent
Funakoshi et al.

(10) Patent No.: US 7,522,199 B2
(45) Date of Patent: Apr. 21, 2009

(54) IMAGING DEVICE WITH LIGHT-SHIELDING REGION, CONTROL METHOD THEREOF AND CMOS IMAGE SENSOR WITH LIGHT-SHIELDING REGION

(75) Inventors: Jun Funakoshi, Kawasaki (JP);
Katsuyoshi Yamamoto, Kawasaki (JP);
Asao Kokubo, Kawasaki (JP);
Toshitaka Mizuguchi, Kawasaki (JP);
Tsuyoshi Higuchi, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 497 days.

(21) Appl. No.: 10/995,394

(22) Filed: Nov. 24, 2004

(65) Prior Publication Data

US 2006/0001753 A1 Jan. 5, 2006

(30) Foreign Application Priority Data

Jul. 2, 2004 (JP) ............................. 2004-197333

(51) Int. Cl.
*H04N 9/64* (2006.01)
(52) U.S. Cl. ..................................... 348/245
(58) Field of Classification Search ................. 348/244, 348/245
See application file for complete search history.

(56) References Cited

U.S. PATENT DOCUMENTS

| 5,608,455 | A | * | 3/1997 | Oda ............................. 348/295 |
| 6,046,771 | A | * | 4/2000 | Horii ........................... 348/243 |
| 6,727,486 | B2 |   | 4/2004 | Choi |
| 6,831,686 | B1 |   | 12/2004 | Koren et al. |
| 2003/0202111 | A1 | * | 10/2003 | Park ............................ 348/243 |
| 2004/0021775 | A1 |   | 2/2004 | Kondo et al. |
| 2004/0080629 | A1 |   | 4/2004 | Sato et al. |

FOREIGN PATENT DOCUMENTS

| JP | 11-331883 |   | 11/1999 |
| JP | 2000-261730 | A | 9/2000 |
| JP | 2001-45385 |   | 2/2002 |
| JP | 2002-218324 | A | 8/2002 |
| JP | 2002-526992 | A | 8/2002 |
| JP | 2004-15712 |   | 1/2004 |
| KR | 2003-0022358 | * | 3/2003 |
| KR | 2003-0094511 | * | 12/2003 |

OTHER PUBLICATIONS

Japanese official communication mailed Sep. 9, 2008.

* cited by examiner

*Primary Examiner*—David L Ometz
*Assistant Examiner*—Dillon Dumford-Geszvain
(74) *Attorney, Agent, or Firm*—Fujitsu Patent Center

(57) ABSTRACT

An imaging device provided with a read circuit in which a light-shielding region is formed in a part of an image region where a plurality of optical/electrical conversion devices is two-dimensionally arrayed in the row and column directions and which converts a optically detected signal outputted from each of the optical/electrical conversion devices for each of the column into a digital signal, comprises a storage device for storing the outputted digital signal outputted in relation with the optical/electrical conversion device in the light-shielding region and a difference calculation device for calculating a difference between the outputted digital signal in relation with the optical/electrical conversion device in a light-receiving region except the light-shielding region and a value stored in the storage device.

15 Claims, 12 Drawing Sheets

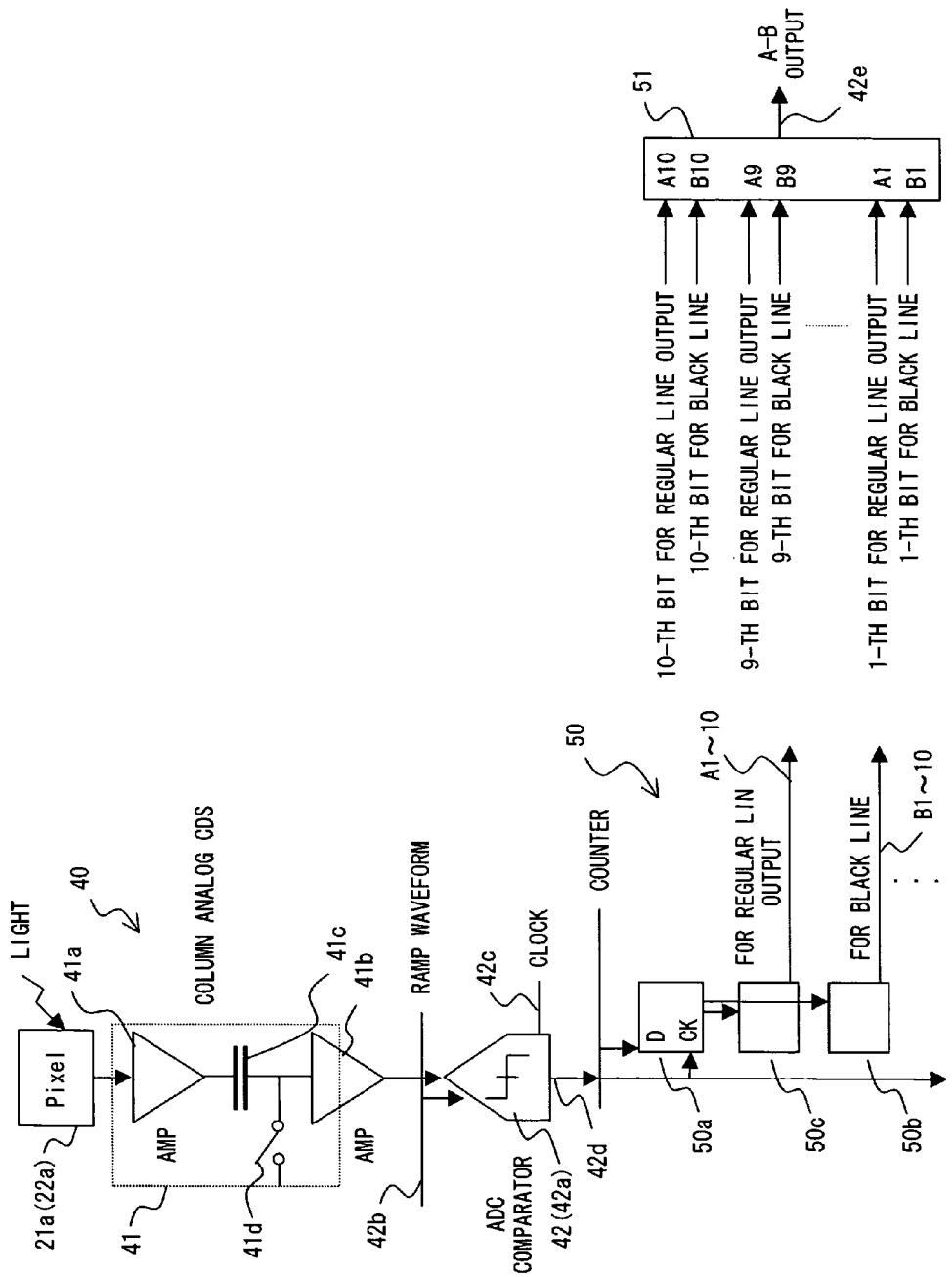
F I G. 1

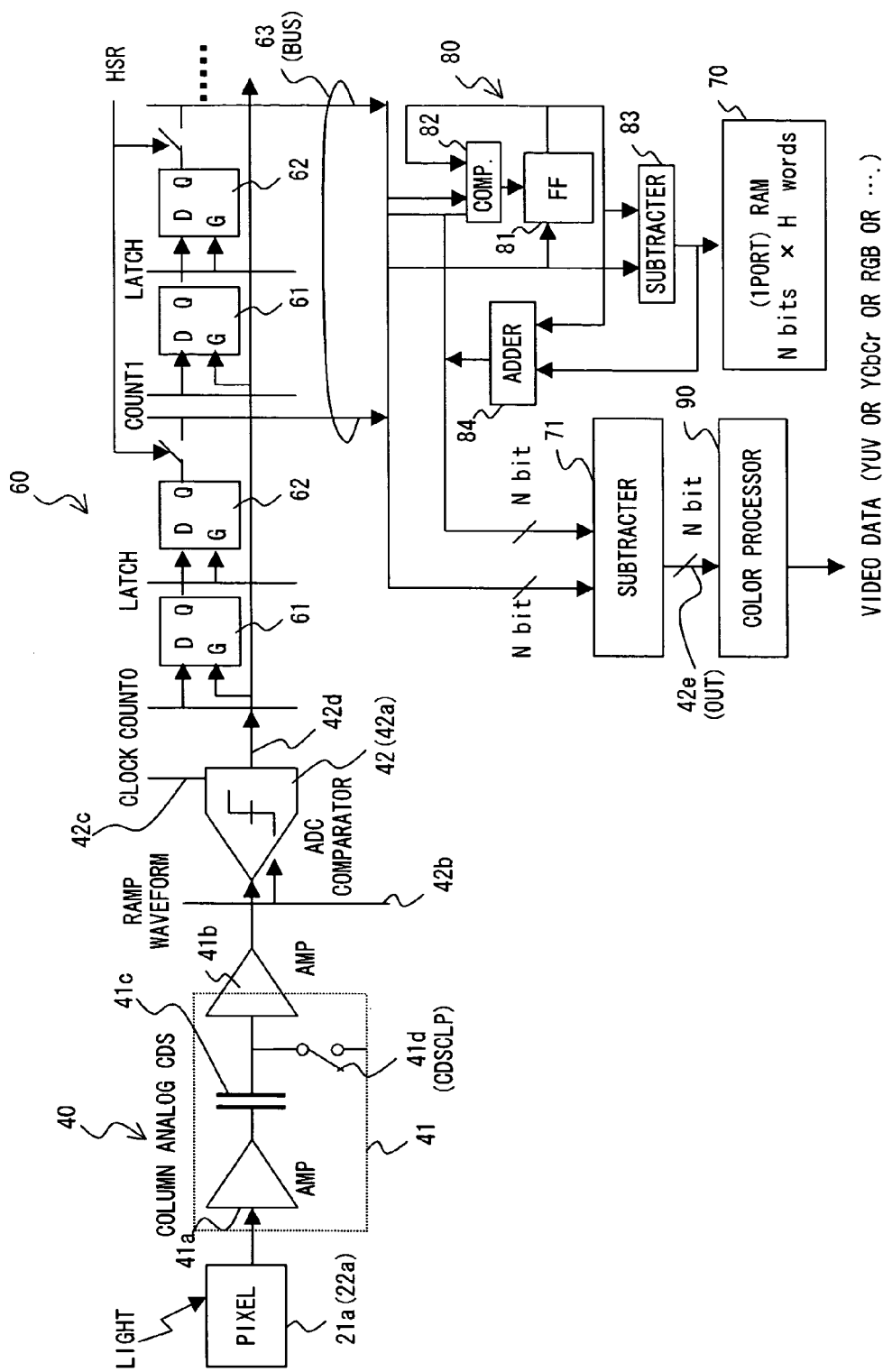
F I G. 10

IMAGING DEVICE WITH LIGHT-SHIELDING REGION, CONTROL METHOD THEREOF AND CMOS IMAGE SENSOR WITH LIGHT-SHIELDING REGION

CROSS-REFERENCE TO RELEASED APPLICATIONS

This application is based upon and claims the benefit of priority from the prior Japanese Patent Application No. 2004-197333, filed in Month July, 2004, the entire contents of which are incorporated herein by reference.

BACKGROUND OF THE INVENTION

1. Field of the Invention

The present invention relates to an imaging technology, more particularly to a technology capable of being effectively applied to imaging devices, such as a complementary metal oxide semiconductor (CMOS) image sensor and the like.

2. Description of the Related Art

For example, compared with a charge coupled device (CCD) image sensor, a CMOS image sensor is well matched with peripheral image processing circuits in a manufacturing process, operating voltage and the like, and in the CMOS image sensor, an imaging device, an image processing circuit, a controller and the like can be easily integrated on one chip.

Since in this CMOS image sensor, not only an optical/electrical conversion device but a conversion signal can also be amplified at each pixel level, the CMOS image sensor has an advantage of being resistant to noise in the transmission process of an optically/electrically converted signal. However, the CMOS image sensor has fixed pattern noise due to the uneven characteristic of an amplifier at each pixel level, which is a problem.

In this case, as the countermeasure, a configuration in which the same number of correlation double sampling (CDS) circuits and analog/digital conversion (ADC) circuits as that of columns are arrayed in parallel for each set of pixels in the column direction of a plurality of pixels two-dimensionally arrayed in the orthogonal row and column directions, that is, a configuration for reducing the fixed pattern noise by a so-called column ADC method, is known.

However, in this column ADC method, an output image takes a vertical striped pattern due to unevenness (column offset) in an ADC circuit and the like among columns, which is another problem.

In order to offset the column offset, it is possible to duplicate the circuit configuration of a column ADC to offset the unevenness between the two systems. However, even in this case, the unevenness of the original main signal system, due to unevenness among devices composing each pixel cannot be offset.

As to the CMOS image sensor, for example, Patent Reference 1 discloses a technology for diagnosing/managing the operation of the entire image sensor using a state machine and solving the problem of a column CDS by digitizing a processing signal.

Patent Reference 1: Japanese Patent Application Laid-open No. 11-331883.

SUMMARY OF THE INVENTION

It is an object of the present invention to provide a technology capable of preventing the degradation of an output image due to an uneven characteristic among the reading processing circuits in an imaging device in which the reading processing circuit of an optically/electrically converted signal is disposed for each row or column of a plurality of two-dimensionally arrayed pixels.

The first aspect of the present invention is an imaging device provided with a read circuit in which a light-shielding region is formed in a part of an image region where a plurality of optical/electrical conversion devices is two-dimensionally arrayed in the row and column directions and which converts an optically detected signal outputted from each of the optical/electrical conversion devices for each of the column into a digital signal, comprises a storage device for storing the outputted digital signal in relation with the optical/electrical conversion device in the light-shielding region and a difference calculation device for calculating a difference between the outputted digital signal and a value stored in the storage device in relation with the optical/electrical conversion device in a light-receiving region except the light-shielding region.

The second aspect of the present invention is the control method of an imaging device provided with a read circuit in which a light-shielding region is formed in a part of an image region where a plurality of optical/electrical conversion devices is two-dimensionally arrayed in the row and column directions and which converts an optically detected signal outputted from each of the optical/electrical conversion devices for each of the column into a digital signal, comprises a first step of storing the outputted digital signal in relation with the optical/electrical conversion device in the light-shielding region and a second step of calculating a difference between the outputted digital signal and a value stored in the first step in relation with the optical/electrical conversion device in the light-receiving region except the light-shielding region.

In the present invention, a read value inputted through each read circuit of an optical black line composed of one row of optical/electrical conversion devices in the row direction of the light-shielding region is stored as digital data, and later when reading data from an optical/electrical conversion device in the light-receiving region, a difference obtained by subtracting data for each column, stored in the storage device from the pure read value at that time is designated to be image data. The read value in the light-shielding region stored in the storage device includes column offset, which is unevenness among the read circuits, and the read value of an optical/electrical conversion device in the light-receiving region also includes column offset. Therefore, by outputting both the differences, column offset can be offset.

Thus, no noise, such as a vertically striped pattern, due to column offset occurs in an outputted image, and accordingly, the degradation of image quality can be prevented.

For example, there is no need to duplicate each read circuit provided for each column of a pixel, and accordingly, circuit scale does not increase.

BRIEF DESCRIPTION OF THE DRAWINGS

FIG. 1 is a block diagram showing a part of the configuration of the imaging device in the first preferred embodiment of the present invention for implementing the control method;

FIG. 10 conceptually shows a part of the imaging device in the third preferred embodiment of the present invention;

DESCRIPTION OF THE PREFERRED EMBODIMENTS

The preferred embodiments of the present invention are described in detail below with reference to the drawings.

Figure 2:
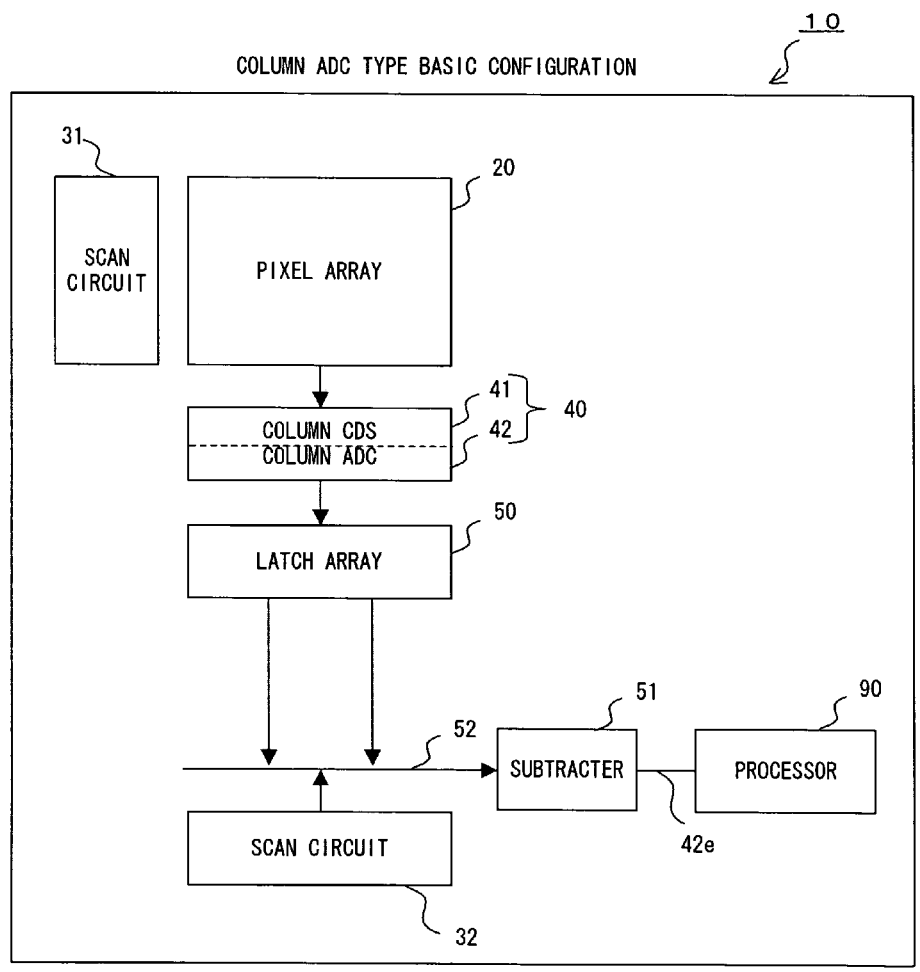
FIG. 2 conceptually shows one entire configuration of an imaging device in the first preferred embodiment of the present invention.
Figure 3:
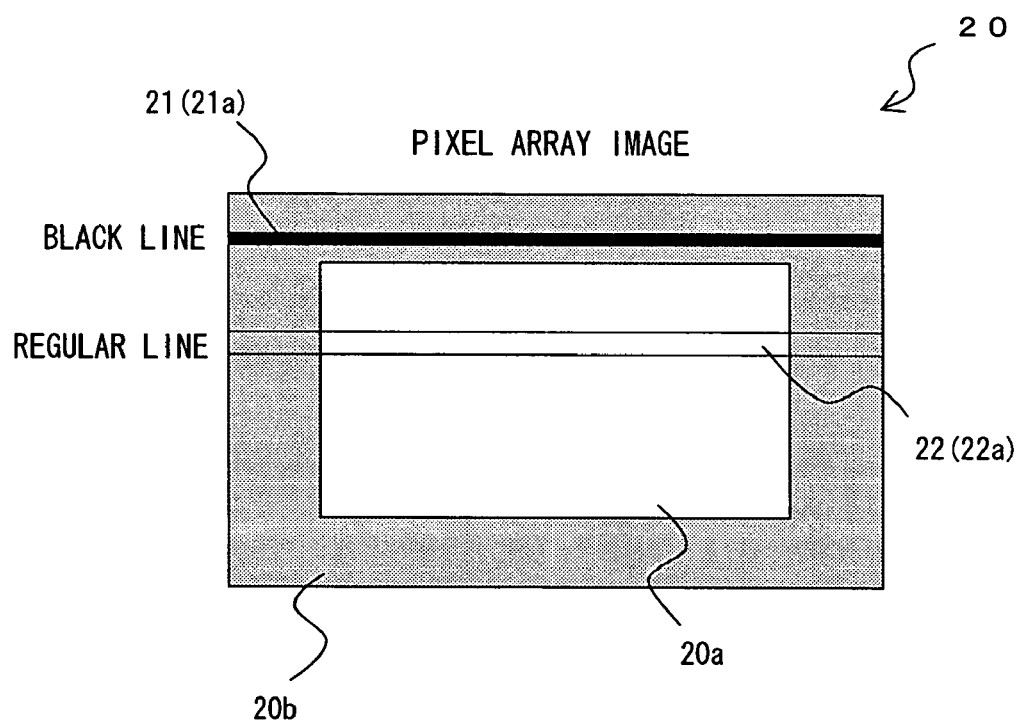
FIG. 3 conceptually shows a part of the imaging device in the first preferred embodiment of the present invention.
Figure 4:
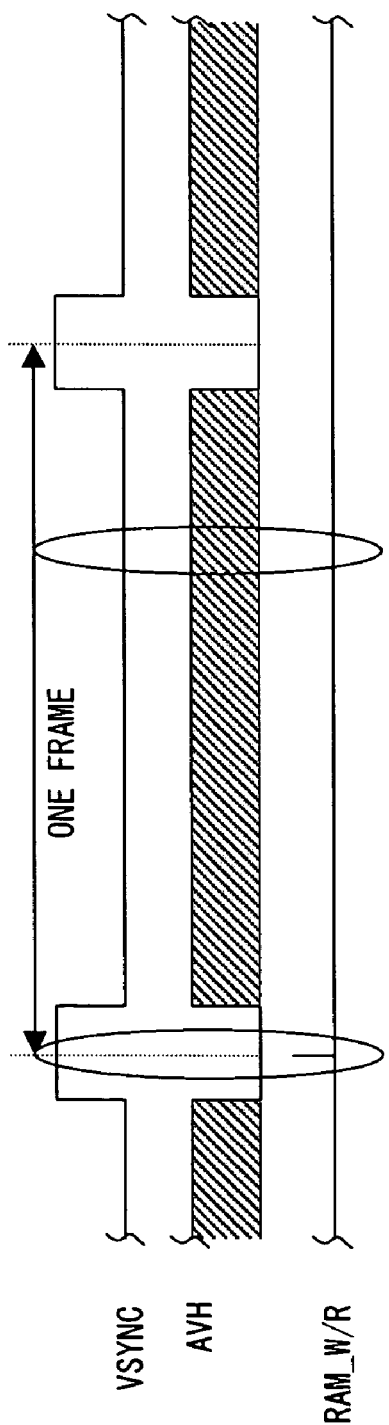
FIG. 4 is a diagram showing one example of the function of the imaging device in the preferred embodiment of the present invention.
Figure 5:
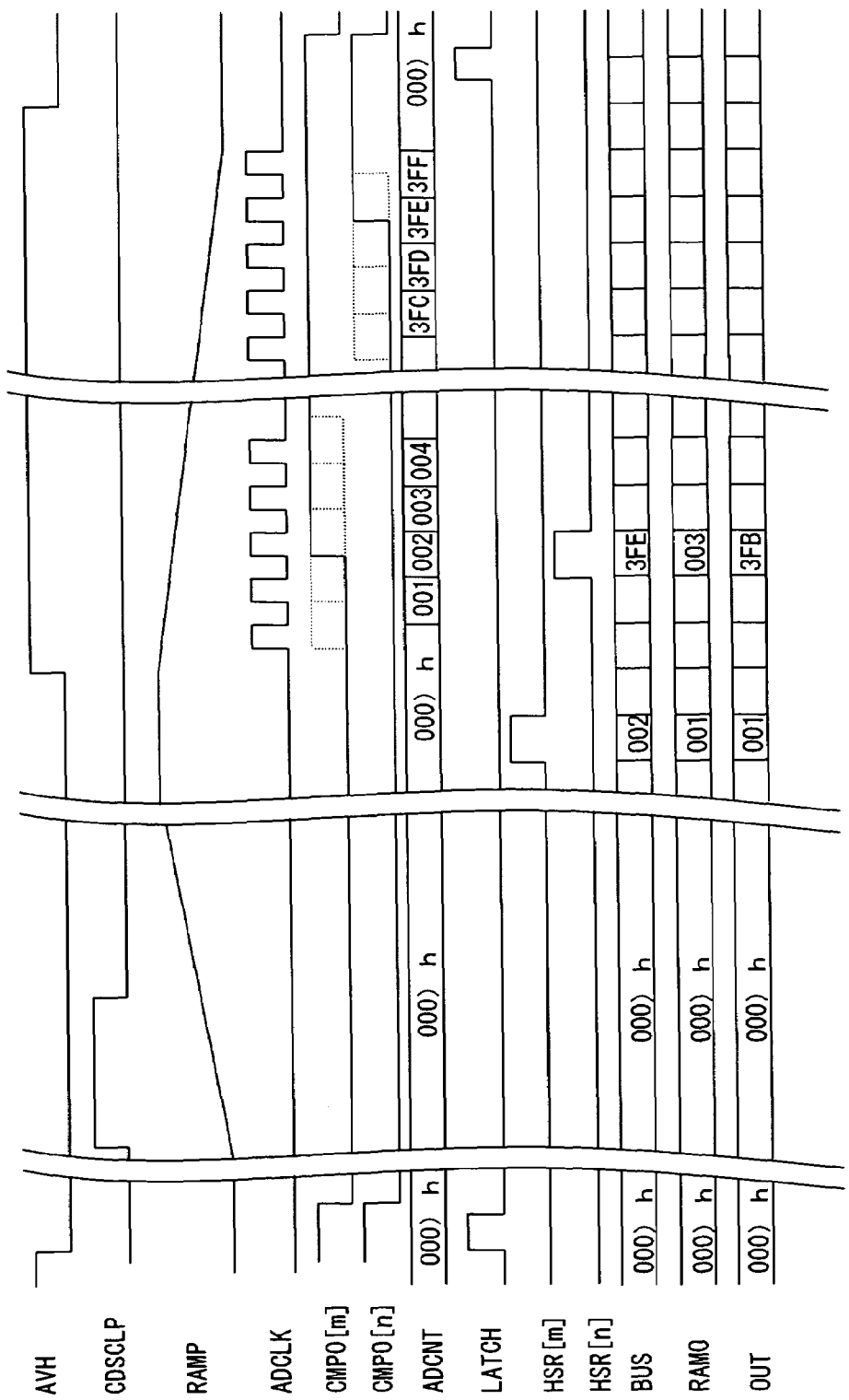
FIG. 5 is a diagram showing one example of the function of the imaging device in the preferred embodiment of the present invention.

FIG. 1 is a block diagram showing a part of the configuration of the imaging device in the first preferred embodiment of the present invention for implementing the control method. FIG. 2 conceptually shows one entire configuration of an imaging device in the first preferred embodiment of the present invention. FIG. 3 conceptually shows a part of the imaging device in the first preferred embodiment of the present invention. FIGS. 4 and 5 are diagrams showing one example of the function of the imaging device in each preferred embodiment of the present invention As shown in FIG. 2, an imaging device 10 in the first preferred embodiment comprises a pixel array 20 in which a plurality of pixels each composed of an optical/electrical conversion device is two-dimensionally arrayed in the row and column directions, a vertical synchronization scan circuit 31 and a horizontal synchronization scan circuit 32, both for reading picture signals from the pixel array 20, a column read circuit 40 provided for each column of the plurality of pixels, a latch array 50, a subtracter 51 connected to the latch array 50 through a bus 52 and an image processor 90. Although in the example of FIG. 2, the image processor 90 is incorporated into the imaging device, it can also be externally installed.

As shown in FIG. 3, the pixel array 20 comprises a light-receiving region 20a into which light is inputted from an imaging target and a light-shielding region 20b which is provided around the light-receiving region 20a, and covers a part of the light-receiving region 20a with a light-shielding film like a frame.

Therefore, one row in the row direction of the light-shielding region 20b is called an optical black line 21, and all pixels in the optical black line 21 become light-shielding pixels 21a to which light is never applied.

However, one row in the row direction of the light-receiving region 20a is called a light-receiving line 22, and all pixels in the light-receiving line 22 (except for those at each end of the light-shielding region 20b) become light-receiving pixel 22a which contribute to imaging.

Each two-dimensionally arrayed pixel unit (a light-shielding pixel 21a and a light-receiving pixel 22a) includes a photo-diode for converting inputted light into an electrical signal and a transistor for amplifying the output of the photo-diode, which are both manufactured in the CMOS process.

Each of the plurality of column read circuits 40 provided for each column of the plurality of pixels includes a column CDS 41 and a column ADC 42 which are both arrayed in the processing order of an optically/electrically converted signal outputted from the light-shielding pixel 21a or light-receiving pixel 22a included in the column.

The column CDS 41 comprises an amplifier 41a on the input side of the optically/electrically converted signal, an amplifier 41b on the output side, a clamp capacitor 41c provided between them and a control switch 41d for controlling the connection of the clamp capacitor 41c to a reference potential, which is not shown in FIG. 3. The column CDS 41 eliminates noise included in the optically/electrically converted signal outputted from a pixel, by correlation double sampling.

Specifically, by switching the control switch 41d off in synchronization with the reset of each pixel in the pixel array 20, offset voltage at the time of reset is stored in the clamp capacitor 41c, and by switching the control switch on at the time of the input of an optically/electrically converted signal, the optically/electrically converted signal is offset by the offset voltage and the offset optically/electrically converted signal is inputted to the column ADC 42 disposed after it through the amplifier 41 b.

The column ADC 42 comprises a comparator 42a for converting the optically/electrically converted signal into digital data, using the optically/electrically converted signal outputted from the column CDS 41, a ramp waveform signal 42b and a clock signal 42c as input.

Specifically, in the comparator 42a, the clock signal 42c counts time until both levels intersect with each other after the optically/electrically converted signal and the inclined ramp waveform signal 42b which gradually decreases or increases as time elapses are synchronized and inputted, and this count value is serially outputted as digital output 42d with a prescribed bit width, indicating the size of the level (pixel luminance) of the optically/electrically converted signal.

In the latch array 50 disposed after the column read circuit 40, the same number of sets of:

(a) an input stage latch 50a taking in one bit of an output from a counter in synchronization with the digital output 42d serially outputted from the column ADC 42, wherein the counter is not shown in FIG. 1 as a drawing and the counter counts in synchronization with the digital output 42d;

(b) a black line latch 50b; and (c) a regular line latch 50c, as the bit width of the counter, are provided.

Then, each bit of the counter corresponding to the light-shielding pixel 21a that belongs to the optical black line 21 is stored in the black line latch 50b, and each bit of the counter corresponding to the light-receiving pixel 22a that belongs to the light-receiving line 22 is stored in the regular line latch 50c.

The black line latch 50b and the regular line latch 50c are connected to the subtracter 51 through the bus 52. By outputting a bit string stored in a plurality of black line latches 50b and a bit string stored in a plurality of regular line latches 50c to the subtracter 51 through the bus 52 and subtracting the former from the latter in this subtracter 51, the data of the light-shielding pixel 21a stored in the black line latch 50b is subtracted from the data of the light-receiving pixel 22a stored in the regular line latch 50c, and the uneven characteristic (column offset) of each of the plurality of column read circuits 40 disposed for each column of the plurality of pixels in the pixel array 20 is offset. Then, the result of the subtraction is outputted to the image processor 90 disposed after the subtracter 51 as digital output 42e.

The image processor 90 is provided with a function to control the entire operation of the imaging device 10 to offset the column offset of the column read circuit 40 in this preferred embodiment and is further provided with a function to convert the digital output 42e outputted from the subtracter 51 into an image signal with an arbitrary rating, such as YUV, YCbCr, RGB or the like, and to output the signal.

One example of the function of the latch array 50 in this preferred embodiment is described below with reference to the drawings shown in FIGS. 4 and 5 and the flowchart shown in FIG. 6.

In the imaging operation of the pixel array 20, both scanning for each row from top to down in order by the horizontal synchronization scan circuit 32 synchronous with a vertical synchronization signal VSYNC and the scanning (transfer process) in the column direction by the horizontal synchronization scan circuit 32 of a plurality of segments of pixel data to be processed for each row by the column read circuit 40 are performed. The operation of outputting the result of both the scanning for one screen (one frame) is repeated in a prescribed cycle.

As shown in FIG. 4, the vertical synchronization signal VSYNC is switched on (at "H" level) while the light-shielding region 20b at the top and bottom ends of one frame continues, that is, using the switching of one frame as a trigger, and it is switched off (at "L" level) while the light-receiving region 20a continues. The reversal applies to the horizontal synchronization signal AVH, and the horizontal synchronization signal AVH is switched on while the light-receiving region 20a continues.

Each pixel is reset while the horizontal synchronization signal is off, and as shown in the upper section of FIG. 5, a CDS clamp signal CDSCLP indicating the on/off timing of the control switch 41d of the column CDS 41 is switched on while the horizontal synchronization signal AVH is off. Thus, in order to eliminate fixed noise in each pixel, the CDS clamp signal CDSCLP turns the control switch 41d on and noise potential is stored in the clamp capacitor 41c. Then, while the horizontal synchronization signal AVH is on, an optically/electrically converted signal is taken in from each pixel and the fixed noise of each pixel is eliminated in the column CDS 41 (correlation double sampling process).

Figure 6:
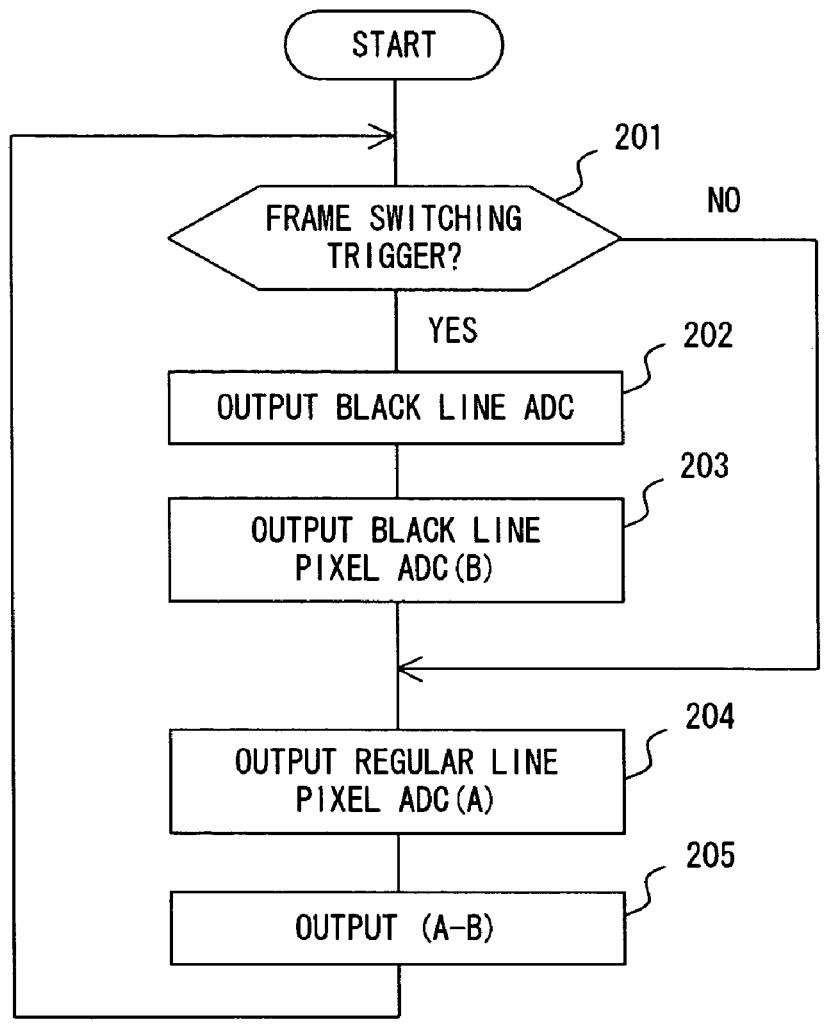
FIG. 6 is a flowchart showing the function of the imaging device in the first preferred embodiment of the present invention.

Then, as shown in the flowchart of FIG. 6, in this preferred embodiment, it is determined whether the vertical synchronization VSYNC is on, that is, whether the frame is switched (step 201). Then, while the vertical synchronization signal VSYNC is on, the column read circuit 40 processes in parallel the light-shielding pixels 21a of each column included in the optical black line 21 (step 202). Then, the digital output 42d (pixel data B) is stored in the black line latch 50b of each latch array 50 (step 203). While the horizontal synchronization signal AVH is on, the light-receiving line 22 (a plurality of light-receiving pixels 22a) is taken in order from top to down and is digitized in the column read circuit 40. Then, the digital output 42d (pixel data A) is stored in the regular line latch 50c of the latch array 50 (step 204). Then, the subtracter 51 calculates the difference (A-B) in digital output 42d between the light-shielding pixel 21a and light-receiving pixel 22a in each column (step 205). Then, repeating the step 201-205, an uneven characteristic (column offset) peculiar to each column read circuit 40 can be offset.

As described above, in this preferred embodiment, by calculating the difference between the optically/electrically converted signal of the light-shielding pixel 21a in the optical black line 21 and the optically/electrically converted signal of the light-receiving pixel 22a in the light-receiving line 22 in both the latch array 50 and the subtracter 51 and outputting the difference to the image processor 90 in a configuration provided with a column read circuit 40 for each column in the pixel array 20, the influence of an uneven operational characteristic (column offset) in each column read circuit 40 can be eliminated from the optically/electrically converted signal of the light-receiving pixel 22a.

Specifically, since in each column, each optically/electrically converted signal of the light-shielding pixel 21a and light-receiving pixel 22a is outputted in a state including offset due to an uneven operational characteristic peculiar to the column read circuit 40 of the column, by calculating the difference between them using the latch array 50 and the subtracter 51, the column offset included the optically/electrically converted signal of the light-receiving pixel 22a can be eliminated and accordingly, the degradation of image quality, such as the occurrence of vertical stripes in an image outputted from the imaging device 10 and the like, can be surely prevented.

Since the digital output 42d of the light-shielding pixel 21a in the black line latch 50b is updated every time a frame is switched, the change with the lapse of time, of temperature and the like can be reflected in both the light-shielding pixel 21a used as a reference and light-receiving pixel 22a. Therefore, the respective fixed pattern noise and column offset due to the temperature change of the light-shielding pixel 21a and light-receiving pixel 22a can be offset, and accordingly, the degradation of an output image due to an uneven characteristic among the column read circuits 40 can be prevented without being affected by the change with the lapse of time of environment and the like.

Therefore, there in no need to provide a plurality of column CDS circuits 40 in parallel in order to offset column offset, and circuit scale does not increase.

Figure 8:
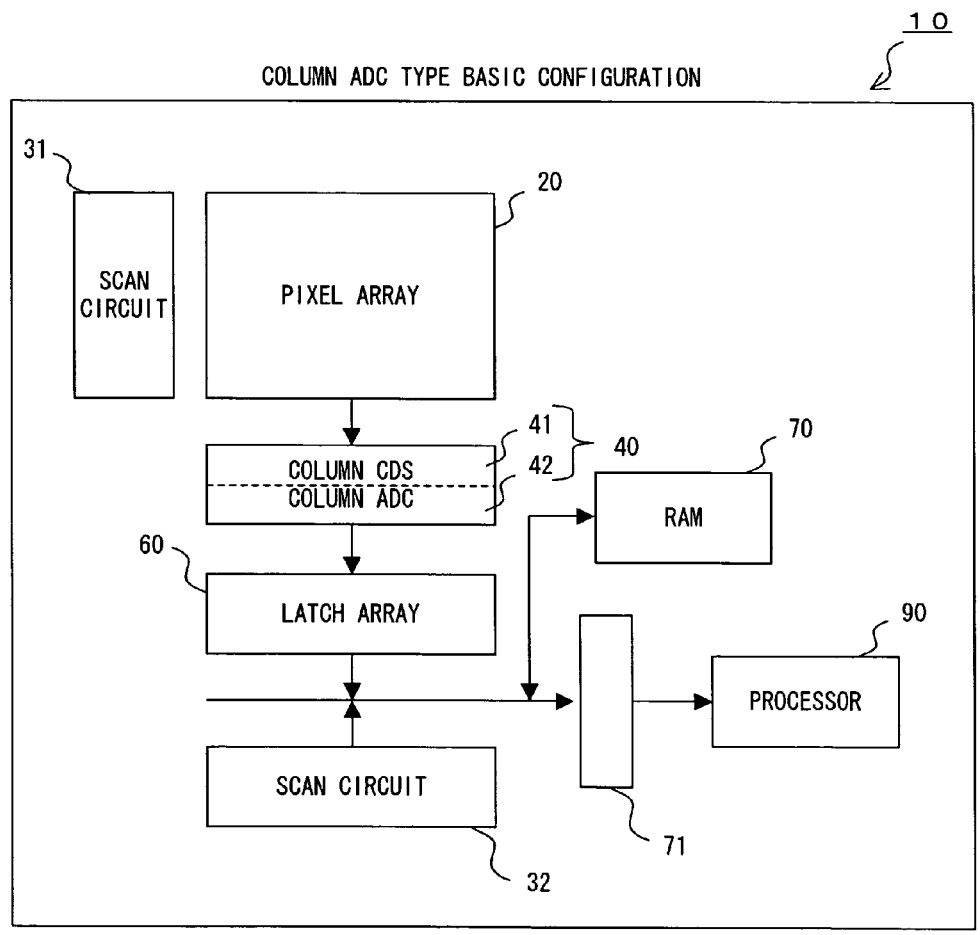
FIG. 8 conceptually shows one entire configuration of an imaging device in the second preferred embodiment of the present invention.
Figure 9:
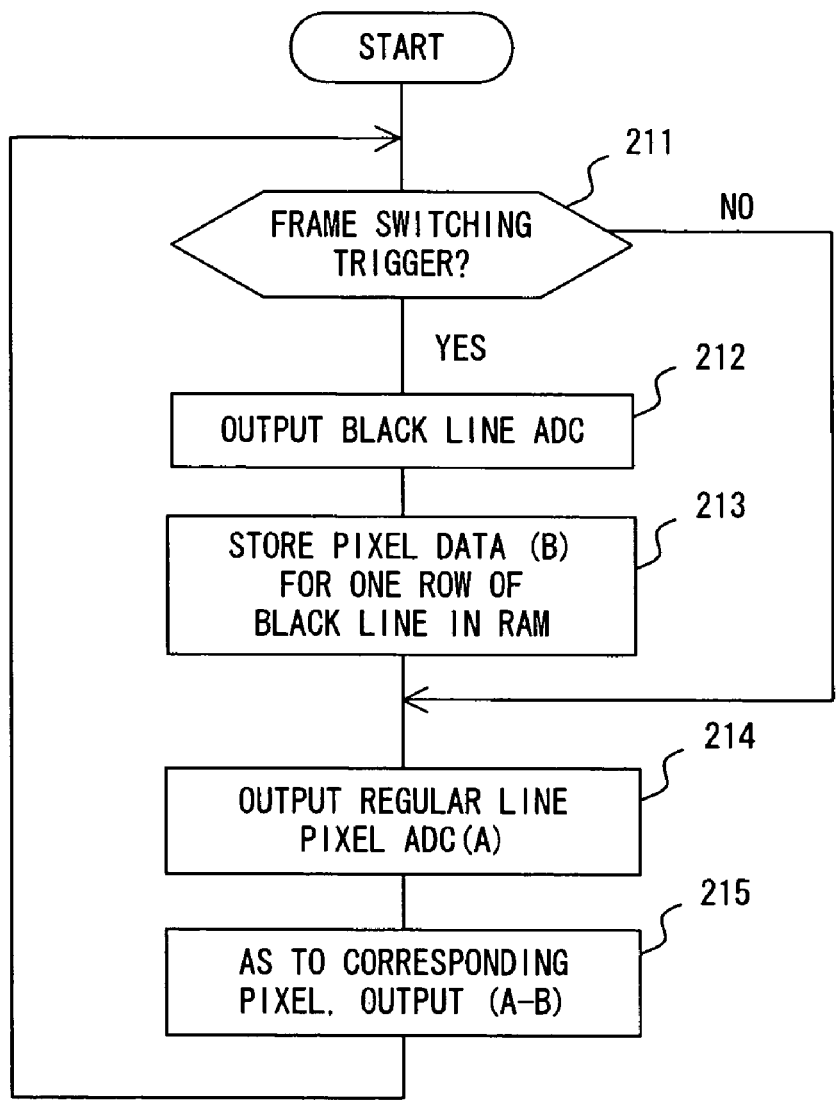
FIG. 9 is a flowchart showing the operation of the imaging device in the second preferred embodiment of the present invention.

Next, the second preferred embodiment of the present invention is described with reference to FIGS. 7, 8 and 9.

Figure 7:
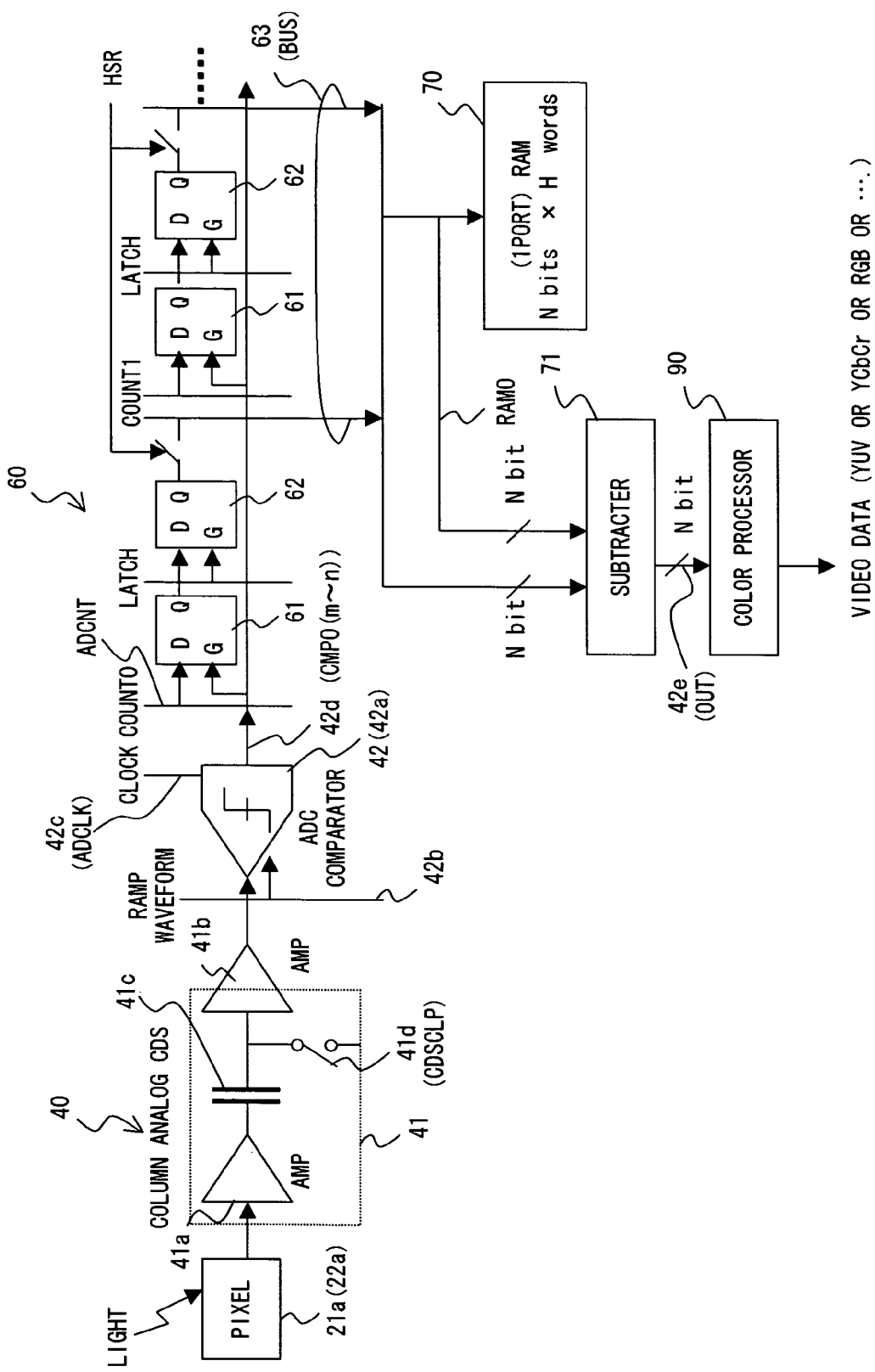
FIG. 7 conceptually shows a part of the imaging device in the second preferred embodiment of the present invention.

FIG. 7 conceptually shows a part of the imaging device in the second preferred embodiment of the present invention. FIG. 8 conceptually shows one entire configuration of the imaging device. FIG. 9 is a flowchart showing the operation of the imaging device.

This second preferred embodiment differs from the above-mentioned first preferred embodiment only in that the data of the optically/electrically converted signal of the light-shielding pixel 21a of the optical black line 21 is stored in a storage device 70, and when processing the light-receiving pixel 22a, the data is read and the data is subtracted from the data of the light-receiving pixel 22a in a subtracter 71.

In the following description, only different components from the first preferred embodiment are described. The same reference numerals are attached to the same components, and their duplicate descriptions are omitted.

Specifically, this second preferred embodiment comprises a latch array 60 disposed after the column read circuit 40, a storage device 70 comprised of random-access memory (RAM) or the like that is composed of semiconductor memory, a subtracter 71 and a bus 63 for connecting the latch array 60, the storage device 70 and the subtracter 71 to each other.

As to the capacity of the storage device 70, it is passable if the capacity is N bits×H words when the number of pixels of the pixel array 20 is H and H dots in the horizontal and vertical directions, respectively, and the bit width of the digital value of one pixel of optically/electrically converted signal is N bits.

In the latch array 60, the same number of a pair of a first-stage latch 61 with one bit and a second-stage latch 62 with one bit, as the number of bits of the digital output 42d in the column read circuit 40 are provided in order to store the data of the optically/electrically converted signals of the current pixels in a row in the storage device 70 and to function as a buffer for consecutively processing pixels in subsequent rows in parallel.

Then, the bit string of the digital output 42d is taken in by each of the first-stage latch 61 according to count signal, count 0 through count n−1, synchronous with the clock signal 42c. The bit data of this first-stage latch 61 is shifted to the second-stage latch 62 according to a latch signal (latch) synchronous with the clock signal 42c and is collectively transferred to the storage device 70 or the subtracter 71 through the bus 63 in synchronization with the horizontal shift register signal HSR of the horizontal synchronization scan circuit 32.

The function of the second preferred embodiment is described below. As shown as an example in the flowchart of FIG. 9, at a trigger of one-frame switching of the pixel array 20 (when the RAM read/write signal RAM_WR shown in FIG. 4 is on) (step 211), the optically/electrically converted signal of the light-shielding pixel 21a of each row of the optical black line 21 is processed in each column read circuit 40 (step 212). Then, the processed optically/electrically converted signal is stored in the storage device 70 through the latch array 60 and bus 63, as digital output 42d (pixel data B) (step 213).

Then, in synchronization with the horizontal synchronization signal AVH, the optically/electrically converted signal of the light-receiving pixel 22a in each column of the light-receiving line 22 is inputted to and processed in the column read circuit 40 in each column, and is transferred to the subtracter 71 through the latch array 60 and the bus 63 as digital output 42d (pixel data A) (step 214). Then, in synchronization with this transfer, the data (RAM0) of the light-shielding pixel 21a in the same column is read into the subtracter 71 from the storage device 70, and their difference (A-B) is calculated (step 215). Then, the operation of outputting the digital output 42e from which column offset is eliminated, to the image processor disposed after the subtracter 71 as the result of the calculation, is repeated for one frame while the horizontal synchronization signal AVH is on.

As described above, in this second preferred embodiment, since a storage device 70 is provided separately from the column read circuit 40 to store the data of the light-shielding pixel 21a, the scale of the latch array 60 linked to the column read circuit 40 can be reduced.

Specifically, in the first preferred embodiment, since the column read circuit 40 is arrayed for each column, the width of disposition region of circuits, such as the column read circuit, latch array 60 and the like is restricted. However, in this second preferred embodiment, since the circuit scale of the latch array 60 and the like is reduced, the disposition width of circuit components, such as the column read circuit 40, latch array 60 and the like does not increase, and accordingly, the number of pixels can be easily increased thanks to the reduction of a pixel pitch.

Next, the third preferred embodiment of the present invention is described with reference to FIGS. 10, 11 and 12.

FIG. 10 conceptually shows a part of the imaging device in the third preferred embodiment of the present invention. FIG. 11 is a timing chart showing the function of the imaging device. FIG. 12 is a flowchart showing the operation of the imaging device.

This third preferred embodiment differs from the above-mentioned second preferred embodiment only in that an offset calculation circuit 80 for processing the digital output 42d of the optically/electrically converted signal of the light-shielding pixel 21a is provided between the bus 63 and the storage device 70.

Specifically, in this third preferred embodiment, the digital output 42d of the light-shielding pixel 21a is not stored in the storage device 70 without any process, but the difference between the relevant digital output 42d and its maximum or minimum value is calculated using the offset calculation circuit 80. By doing so, the amount of data is reduced. Then, the reduced data is stored in the storage device 70, and is restored to the original value when reading the data.

The offset calculation circuit 80 comprises a storage device 81 composed of flip-flops with the bit width of the digital output 42d and the like, a comparator for comparing the digital output 42d coming from the bus 63 with the value stored in the storage device 81, a subtracter 83 for calculating the difference between the digital output 42d coming from the bus 63 and the value stored in the storage device 81, and an adder 84 for reproducing the original value of the digital output 42d by summing the data read from the storage device 70 and the value stored in the storage device 81.

In the process of reading the first light-shielding pixel 21a in order to search for a maximum/minimum value, which is described later, the output of each light-shielding pixel 21a included in the optical black line 21 is read in order in the array direction and is stored in the storage device 81. Then, the comparator 82 determines which is larger, the value stored in the storage device 81 or the output of a subsequent light-shielding pixel 21a. If the value stored in the storage device 81 is smaller than the output of the subsequent light-shielding pixel 21a, the contents of the storage device 81 are overwritten by the output of the subsequent light-shielding pixel 21a, and finally, the maximum value remains in the storage device 81. If the size determination is reversed, the minimum value can remain in the storage device 81.

As described above, in this third preferred embodiment, the optical black line 21 must be read in order to search for the maximum or minimum value before storing the data of the light-shielding pixel 21a in the storage device 70.

Figure 11:
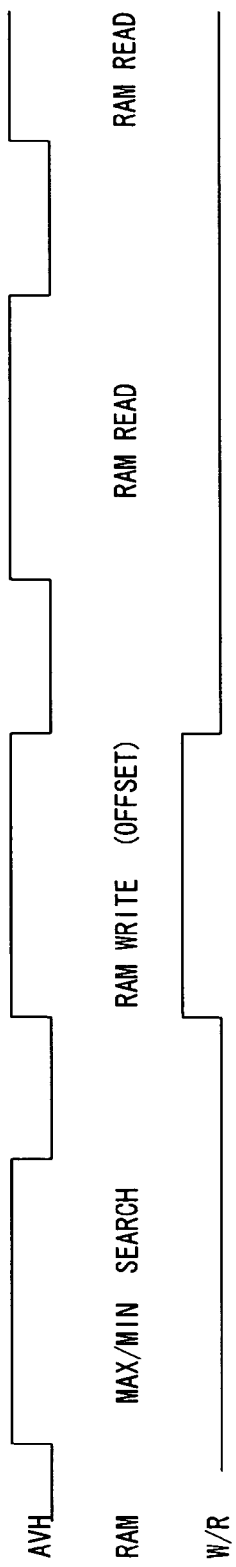
FIG. 11 is a timing chart showing the function of the imaging device in the third preferred embodiment of the present invention.
Figure 12:
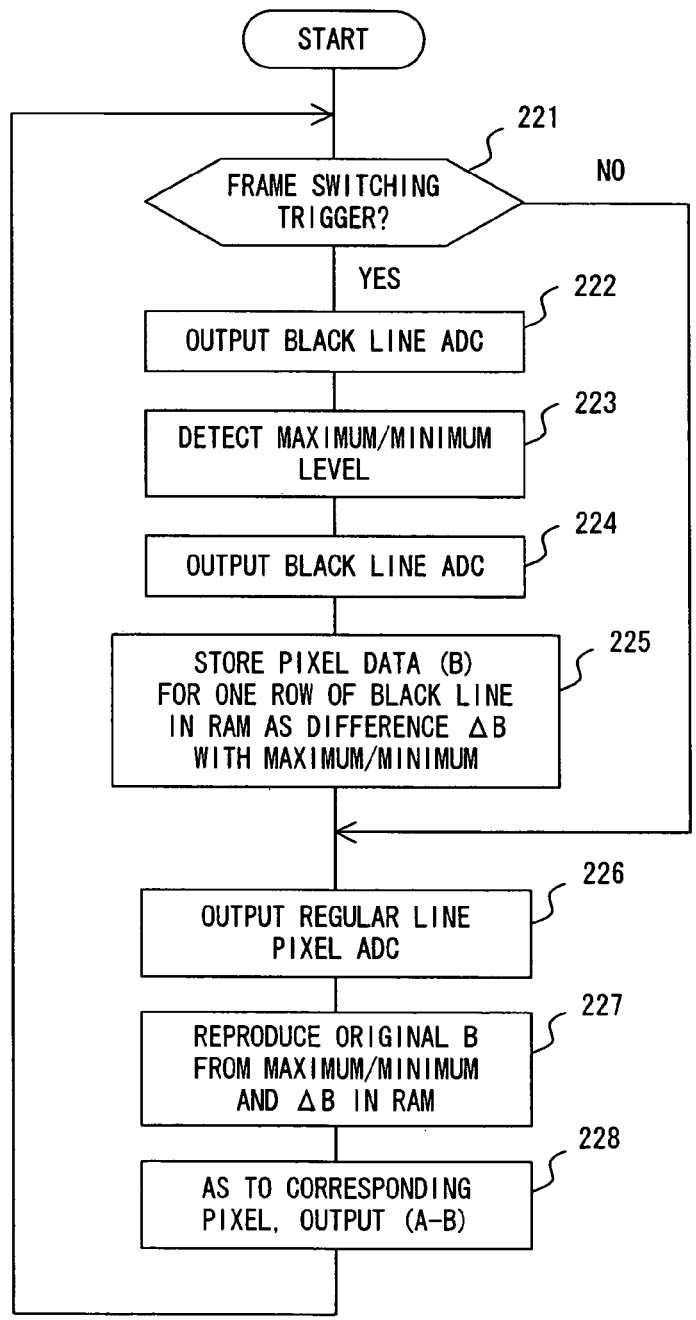
FIG. 12 is a flowchart showing the operation of the imaging device in the third preferred embodiment of the present invention.

Specifically, as shown in FIG. 11, the maximum or minimum value of the digital output 42d of the first optical black line 21 read using frame switching as a trigger is searched for one frame while the horizontal synchronization signal AVH is on, and is stored in the storage device 81 (the RAM read/write signal RAM_WR shown in FIG. 4 is on). Then, the difference between the digital output 42d of the optical black line 21 read using subsequent frame switching as a trigger and the maximum or minimum value is calculated and is stored in the storage device 70 (the RAM read/write signal RAM_WR shown in FIG. 4 is on). Then, in a subsequent frame process, the difference between the data of the light-shielding pixel 21a read from the storage device 70 and the digital output 42d of the light-receiving pixel 22a is calculated and column offset.

Such a series of processes are described below with reference to the flowchart shown in FIG. 12. Specifically, at a trigger of frame switching (step 221), the digital output 42d of the optical black line 21 is outputted to the offset calculation circuit 80 (step 222). Then, the maximum or minimum value is detected and stored in the storage device 81 (step 223). Then, using subsequent frame switching as a trigger, the digital output 42*d* of the optical black line 21 is taken in again (step 224). Then, the difference (ΔB) between the digital output 42*d* of each light-shielding pixel 21*a* (pixel data B) and the maximum or minimum value of the storage device 81 is calculated by the subtracter 83 and is stored in the storage device 70 (step 225).

Then, the digital output 42*d* of each light-receiving pixel 22*a* of the regular light-receiving line 22 (pixel data A) is processed (step 226). Simultaneously, in the offset calculation circuit 80, the value (ΔB) of a corresponding light-shielding pixel 21*a* is read from the storage device 70, and by summing the value (ΔB) and the value of the storage device 81, the original pixel data B of the light-shielding pixel 21*a* is reproduced (step 227). Then, the difference (A-B) is calculated by the subtracter 71, and the column offset of the pixel data A of the light-receiving pixel 22*a* is offset (step 228). Then, the pixel data A whose column offset is offset is outputted to the image processor disposed after the subtracter 71 as digital output 42*e*.

As described above, in this third preferred embodiment, the maximum or minimum value of the respective digital outputs 42*d* of a plurality of light-shielding pixels 21*a* is calculated as a reference value, and the difference between the value of the digital output 42*d* of the light-shielding pixel 21*a* and the reference value is stored in the storage device 70. Therefore, the capacity of the storage device 70, for storing the data of the digital output 42*d* of the light-shielding pixels 21*a* can be reduced.

Therefore, the degradation of an output image due to an uneven characteristic among the column read circuits 40 can be prevented without the increase of the circuit scale of the imaging device 10.

Although in the above-mentioned preferred embodiments, the maximum or minimum value is used as a reference value, the median of the maximum and minimum values can also be used as a reference value and is stored in the storage device 81.

The present invention is not limited to the configurations shown in the above-mentioned preferred embodiments, and any variations and any modifications are possible as long as the subject matter of the present invention is not deviated.

According to the present invention, in an imaging device with a configuration in which the read processing circuit of optically/electrically converted signals are disposed for each row or column of a plurality of two-dimensionally arrayed pixels, the degradation of an output image due to an uneven characteristic among the read processing circuits can be prevented.

What is claimed is:

1. An imaging device in which a light-shielding region is formed in a part of an image region where a plurality of optical/electrical conversion devices is two-dimensionally arrayed in the row and column directions, comprising:
    a read circuit for converting an optically detected signal outputted from each of the optical/electrical conversion devices in a light-receiving region for each column into a first digital signal corresponding to the light-receiving region and for converting an optically detected signal outputted from each of the optical/electrical conversion devices in a light-shielding region for each column into a second digital signal corresponding to a light-shielding region;
    a storage device for storing the second digital signal;
    a difference calculation device being provided for each column and for calculating a difference between the first digital signal and a value stored in the storage device;
    a second storage device for storing at least one of a maximum value, a minimum value, and a mean value of the maximum value and the minimum value, of the second digital signals;
    a second difference calculator for calculating a difference between the at least one of the maximum value, the minimum value, and the mean value and the second digital signal and storing the difference in a third storage device; and
    an adder for summing the value stored in the third storage device and the at least one of the maximum value, the minimum value, and the mean value stored in the second storage device to reproduce the second digital signal and inputting the reproduced second digital signal to said difference calculator.

2. The imaging device according to claim 1, wherein the second digital signal corresponding to the optically/electrically converted signal in the light-shielding region, stored in said storage device is updated for each frame.

3. The imaging device according to claim 1, wherein said storage device is composed of a plurality of latch circuits provided for each bit value of the second digital signal for each of the columns.

4. The imaging device, according to claim 1, wherein said storage device is a random-access memory having a capacity of a plurality of words for respectively storing a plurality of the second digital signals corresponding to the plurality of optical/electrical conversion devices for one row in the row direction.

5. The imaging device according to claim 1, wherein said read circuit comprises:
    a correlation double sampling circuit for eliminating noise of the optically detected signal outputted from each read circuit; and
    an analog/digital conversion circuit for converting output from the correlation double sampling circuit into the first and second digital signals.

6. The imaging device according to claim 1, which is a complementary metal oxide semiconductor (CMOS) image sensor.

7. A control method of an imaging device in which a light-shielding region is formed in a part of an image region where a plurality of optical/electrical conversion devices is two-dimensionally arrayed in the row and column directions, comprising:
    converting, by a read circuit provided in the imaging device, an optically detected signal outputted from each of the optical/electrical conversion devices in a light-receiving region for each column into a first digital signal corresponding to the light-receiving region;
    converting, by the read circuit, an optically detected signal outputted from each of the optical/electrical conversion devices in a light-shielding region for each column into a second digital signal corresponding to a light-shielding region;
    storing the second digital signal for each column; and
    calculating, for each column, a difference between the first digital signal and the stored second digital signal, wherein
    in said storing, at least one of a maximum value, a minimum value, and a mean value of the maximum value and the minimum value, of the second digital signals is stored as a reference value, and a difference value obtained as a difference between the reference value and the second digital signal is stored; and in said calculating, the second digital signal is reproduced by summing the difference value and the reference value, and a difference between the reproduced second digital signal and the first digital signal is calculated.

8. The control method of an imaging device according to claim 7, wherein the second digital signal is stored every one frame.

9. The control method of an imaging device according to claim 7, wherein the second digital signal is stored in a manner in which each bit of the second digital signal is latched respectively; and the difference is calculated for each latched bit.

10. The control method of an imaging device according to claim 7, wherein a plurality of the second digital signals corresponding to the plurality of optical/electrical conversion devices for one row in the row direction is stored in random-access memory; and the second digital signal corresponding to each of the plurality of optical/electrical conversion devices for the row is read from the random-access memory and the difference is calculated.

11. The control method of an imaging device according to claim 7, wherein said imaging device is a complementary metal oxide semiconductor (CMOS) image sensor.

12. A column analog/digital conversion (ADC) type complementary metal oxide semiconductor (CMOS) image sensor provided with:

a circuit to store, for each column in advance, the read value of an optical black line in a light-shielding region in random-access memory (RAM); and a circuit to output, for each column, a difference between the read value of a valid pixel in a light-receiving region and the read value of the optical black line in the light-shielding region as a value read from the valid pixel, wherein the maximum value and minimum value are based on the read value of the optical black line in the light-shielding region in order to reduce the number of bits to be stored, at least one of the maximum value, the minimum value, and a mean value of the maximum value and minimum value is subtracted from the read value of the optical black line and the resultant difference value is stored in the RAM.

13. A complementary metal oxide semiconductor (CMOS) image sensor, comprising:

a storage for storing values; and a read circuit configuration with one system per column wherein, the CMOS image sensor is provided with a circuit to store, for each column, the read value of the optical black line in a light-shielding region during one frame, to subtract the stored read value of the optical black line from the read value of a valid pixel in a light-receiving region for each column and to output the balance as the output value of the valid pixel, wherein a maximum value and a minimum value are based on the read value of the optical black line in the light-shielding region in order to reduce the number of bits to be stored in the storage, and at least one of the maximum value, the minimum value, and a mean value of the maximum value and the minimum value is subtracted from the read value of the optical black line and the resulting difference value is stored in the storage.

14. The CMOS image sensor according to claim 13, wherein the storage includes a random-access memory (RAM) for storing the read value of the optical black line in the light-shielding region.

15. The CMOS image sensor according to claim 13, wherein the storage includes a latch array for storing the read value of the optical black line in the light-shielding region.

\* \* \* \* \*